United States Patent [19]

Marlowe et al.

[11] Patent Number: 4,957,322
[45] Date of Patent: Sep. 18, 1990

[54] AERODYNAMICALLY CONFIGURED CAB ROOF ASSEMBLY FOR A TRUCK

[75] Inventors: Huston Marlowe, Orinda; Michikazu J. Tao, Castro Valley; Virgil Pound, San Jose, all of Calif.

[73] Assignee: Paccar Inc., Bellevue, Wash.

[21] Appl. No.: 244,797

[22] Filed: Sep. 15, 1988

[51] Int. Cl.$^5$ .............................................. B62D 35/00
[52] U.S. Cl. ................................................ 296/180.2
[58] Field of Search ........................... 296/180.2, 180.1

[56] References Cited

U.S. PATENT DOCUMENTS

| | | | |
|---|---|---|---|
| 3,711,146 | 1/1973 | Madzsar et al. | 296/180.2 |
| 3,972,556 | 8/1976 | Mason | 296/180.2 |
| 4,245,862 | 1/1981 | Buckley | 296/180.2 |
| 4,343,506 | 8/1982 | Saltzman | 296/180.3 |
| 4,611,847 | 9/1986 | Sullivan | 296/180.2 |
| 4,750,772 | 6/1988 | Haegert | 296/180.2 |

FOREIGN PATENT DOCUMENTS

| | | | |
|---|---|---|---|
| 2459172 | 2/1981 | France | 296/180.2 |
| 150823 | 7/1986 | Japan | 296/180.2 |

Primary Examiner—Robert R. Song
Attorney, Agent, or Firm—Flehr, Hohbach, Test, Albritton & Herbert

[57] ABSTRACT

A truck including a cab having a front windshield and opposite driver and passenger doors, for example a cab-over engine type of truck, is disclosed herein. This truck includes a cab roof, a roof fairing disengageably mounted on the cab roof, and a sunvisor disengageably connected to the cab roof in front of and below the roof fairing. All three of these components of the truck cab are configured so that they present substantially smooth outer front and side joints between adjacent outer surfaces of adjacent components, whereby to enhance the aerodynamic qualities of the cab.

6 Claims, 4 Drawing Sheets

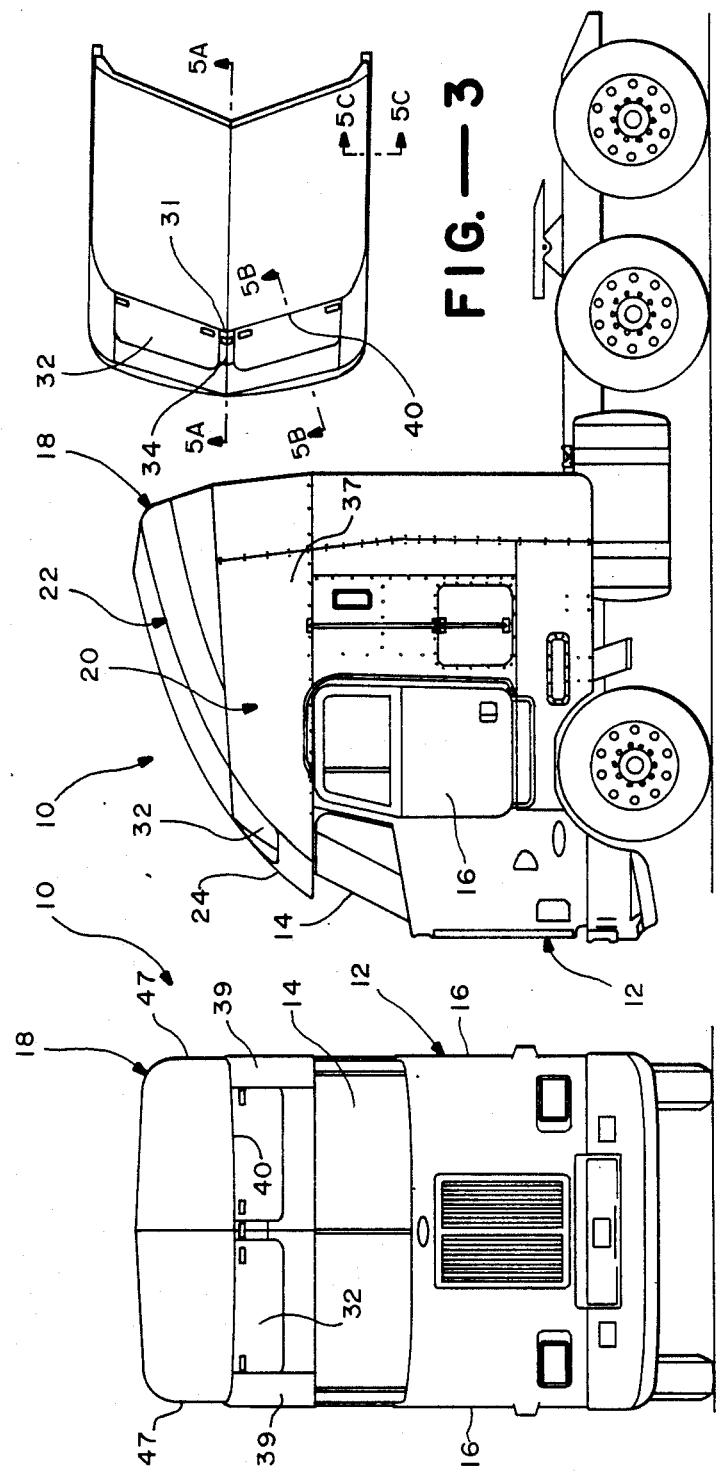

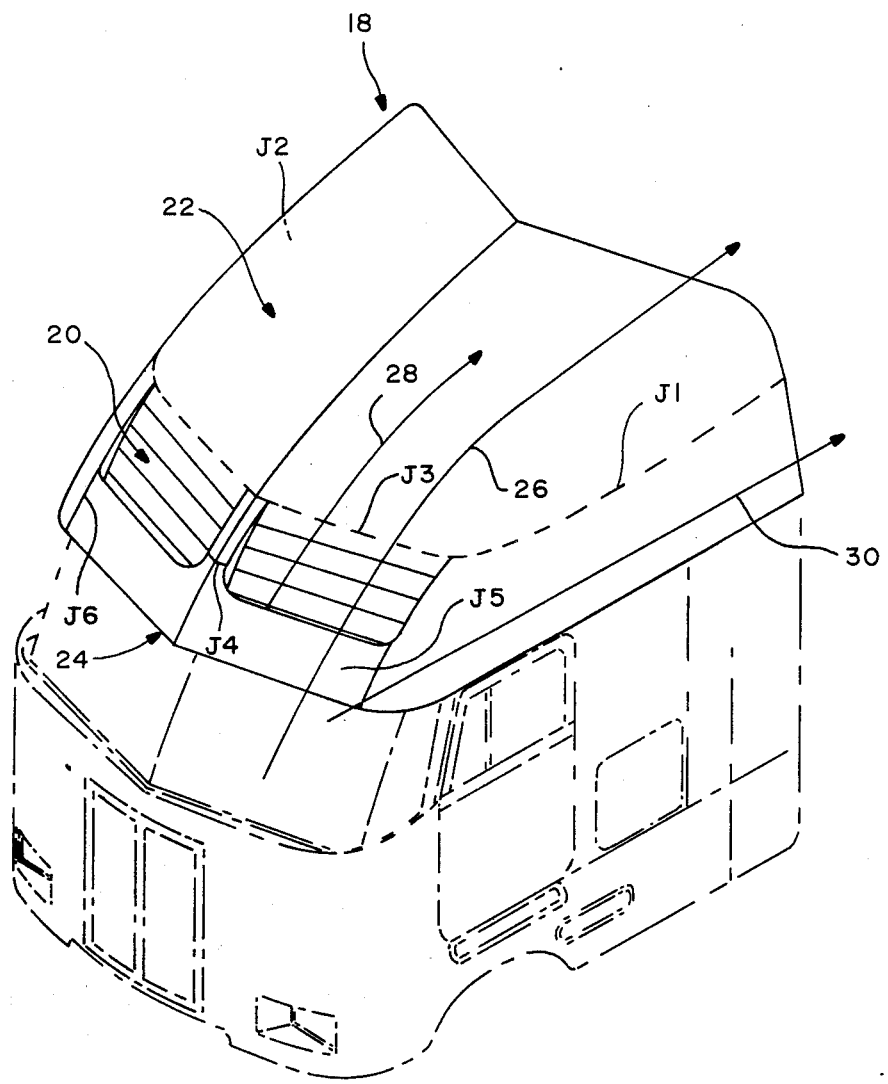
FIG.—4

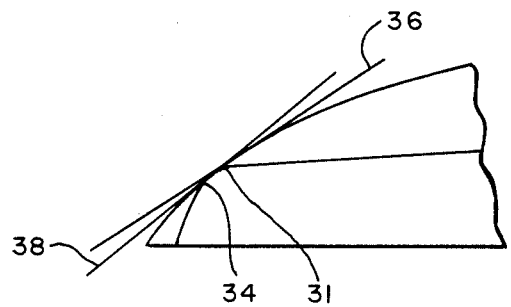
FIG.—5A
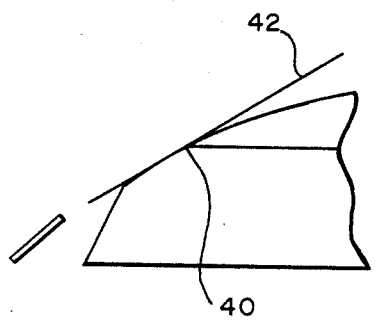
FIG.—5B
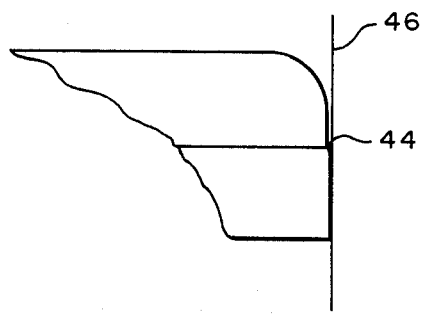
FIG.—5C

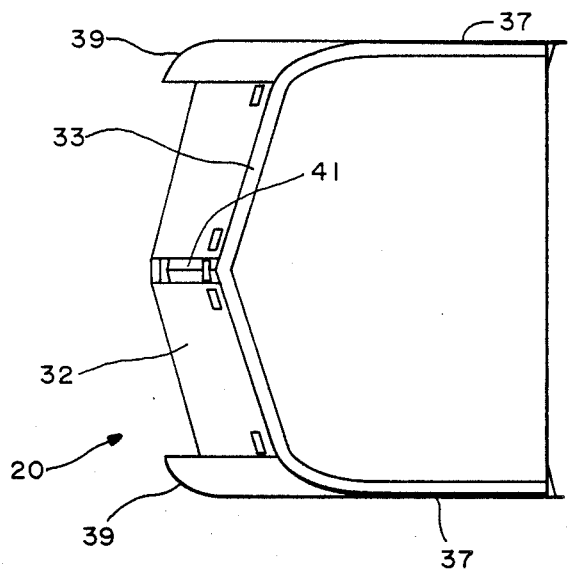
FIG.—6
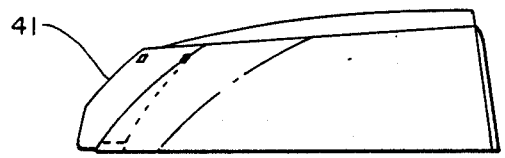
FIG.—7
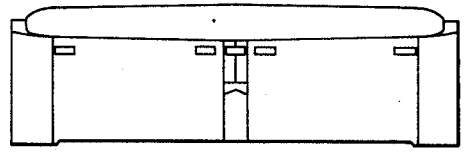
FIG.—8

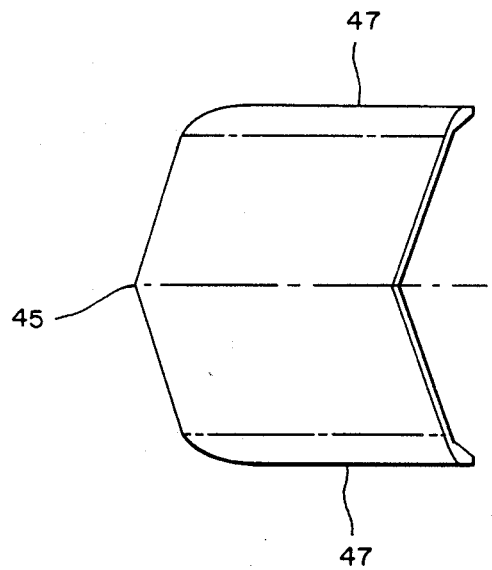
FIG.—9
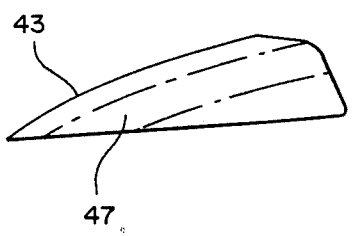
FIG.—10
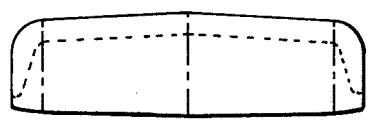
FIG.—11

AERODYNAMICALLY CONFIGURED CAB ROOF ASSEMBLY FOR A TRUCK

The present invention relates generally to trucks and more particularly to an aerodynamically enhanced roof assembly forming part of an overall truck cab.

The utilization of a roof fairing mounted to the roof of a truck cab for reducing drag is well known in the art. One example of a separately mounted fairing can be seen in Mason U.S. Pat. No. 3,972,556. Another example can be found in Buckley U.S. Pat. 4,245,862. In each of these cases, the roof fairing is designed as a separate and distinct component from the roof itself and together the roof and fairing present a series of what may be referred to as interrupted joints between the two. These are joints defined by surfaces that meet abruptly, as distinguished from smooth joints which are those defined by surfaces that meet at a substantially common surface-to-surface tangent across the joint. Applicants have found that the use of interrupted joints seriously compromises the aerodynamic qualities of the overall truck cab.

As will be seen hereinafter, the truck disclosed herein includes a cab having a front windshield, opposite driver and passenger doors, and an overall roof assembly which is designed in accordance with the present invention to enhance the overall aerodynamic qualities of the cab itself. This roof assembly includes a cab roof located above the cab's front windshield and side doors and a roof fairing disengageably mounted on the cab roof so as to establish an outer front joint and opposite outer side joints between the two. The cab roof and roof fairing are specifically designed so that all of these outer joints are smooth or substantially smooth. In an actual working embodiment disclosed herein, the overall roof assembly also includes a front sunvisor located over the front windshield and disengageably connected to the cab roof at a plurality of points so as to establish a plurality of substantially smooth joints between the sunvisor and roof. As a result of all of these smooth joints, as contrasted with some of the interrupted joints present in the Mason and Buckley roof assemblies, the present invention integrates its roof fairing and sunvisor into the cab roof of a truck so as to provide an overall roof assembly which is aerodynamically enhanced.

This overall roof assembly will be described in more detail hereinafter in conjunction with the drawings, wherein:

FIG. 1 is a front elevational view of an overall truck including a cab having a roof assembly designed in accordance with the present invention;

FIG. 2 is a side elevational view of the truck shown in FIG. 1;

FIG. 3 is a top plan View of the cab roof assembly forming part of the truck illustrated in FIGS. 1 and 2;

FIG. 4 is an enlarged isometric view of the cab roof assembly illustrated in FIGS. 1-3, shown in solid lines and in combination with the rest of the truck cab, shown in dotted lines;

FIG. 5A-5C diagrammatically illustrate certain specific features of the roof assembly shown in FIGS. 1-4;

FIG. 6 is a top plan view of the cab roof which forms part of the overall roof assembly illustrated in FIGS. 1-4;

FIG. 7 is a side elevational view of the cab roof shown in FIG. 6;

FIG. 8 is a front elevational view of the cab roof shown in FIGS. 6 and 7;

FIG. 9 is a top plan view of a roof fairing forming part of the overall roof assembly illustrated in FIGS. 1-4;

FIG. 10 is a side elevational view of the roof fairing shown in FIG. 9; and

FIG. 11 is a front elevational view of the roof fairing shown in FIGS. 9 and 10.

Turning now to the drawings, wherein like components are designated by like reference numerals throughout the various FIGS., attention is first directed specifically to FIGS. 1 and 2 which illustrate a truck generally designated by the reference numeral 10. The particular truck shown is of the cab-over-engine type and includes, among other components, a truck cab 12 having, among other components, a front windshield 14, opposite driver and passenger doors 16, and an aerodynamically enhanced, integrated roof assembly 18 designed in accordance with the present invention.

As will be seen hereinafter, a roof assembly 18 is comprised primarily of three components, a cab roof 20, a roof fairing 22 and a front sunvisor 24, all of which are manufactured as separate and distinct components but disengageably connected together to form a single integrated assembly having outer front and side joints, all of which are smooth joints, as contrasted with interrupted joints. The term "smooth joints", as used herein, will be defined hereinafter in conjunction with FIGS. 5A, 5B and 5C. For the moment, it suffices to say that a smooth joint is one which allows air to flow from one surface to an adjacent surface across the joint therebetween in a substantially smooth, uninterrupted manner, whereby to minimize drag reduction at the joint. This is particularly important for the front, sides and top of a truck cab roof when the truck is moving at relatively high speeds. As a result of these smooth joints and because of the shapes of the cab roof 20, fairing 22 and visor 24 making up overall roof assembly 18, this assembly presents what may be characterized as the single integrated roof fairing for purposes of minimizing drag as the truck moves forward.

Referring to FIG. 4, overall roof assembly 18 is illustrated with its outer front and side joints being shown in dotted lines. Note specifically that the three main components making up the roof assembly, that is, the cab roof 20, roof fairing 22 and sunvisor 24 present a series of interconnected, continuous front, side and top surfaces which together serve as a single, integrated fairing, at least functionally. For example, arrow 26 in FIG. 4 represents one path taken by the flow of air as the truck moves forward while arrows 28 and 30 represent two other paths. Note the air following path 26 first moves over the front or forward face of one side of the sunvisor 24 and then, after leaving the sunvisor, reattaches itself to the front top side of fairing 22. At the same time, the air flow following path 28 which at first attaches itself at the front windshield moves under the sunvisor attaching itself to the frontmost face of roof 20 and then, after leaving the cab roof, it attaches itself to the front top face of the roof fairing and moves rearwardly therefrom. Note that the sunvisor is virtually invisible to the flow path 26 and 28. Even though the sunvisor projects out from the cab roof and fairing, it creates substantially no disruption to air flow. This is also true of the roof/fairing joint crossing paths 26 and 28. Arrow 30 represents the way in which the air flows across the sides of the integrated assembly. Should their paths cross the side joint between the cab roof and fairing, it would do so with substantially no disruption, as in the case of flow paths 26 and 28, although as illustrated in FIG. 1, the sides of roof fairing 22 are set in very slightly with respect to the sides of the cab roof, for practical reasons. However, this slight inset contributes only in a negligible way to any disruption in air flow across the sides of the integrated assembly, since flow direction 30 is substantially parallel to the joint.

Since the continuous nature of the front and side joints between cab roof 20, roof fairing 22 and sunvisor 24 is so important, before describing these components in detail, attention is directed to FIGS. 5A–C for a more detailed understanding of the continuous joints. Referring first to FIG. 5A, the overall roof assembly is shown in sectional view along lines 5A–5A in FIG. 3. Note specifically from FIG. 3 that this includes one point 31 on the joint line between a section of roof 20 and the forwardmost section on roof fairing 22 and a point 34 on the joint between a segment of the cab roof and a segment of the sunvisor. FIG. 5A illustrates how the two surfaces defining joint point 31 define a common surface-to-surface tangent 36 and how a similar common surface-to-surface tangent 38 is defined by the two surfaces coming together at joint point 34. In FIG. 5B, the joint point 40 is shown in a front joint between cab roof 20 and fairing 22. A similar common surface-to-surface tangent 42 is provided there. In FIG. 5C, a point 44 is shown on a side joint between the cab roof and fairing and, again, the two surfaces coming together at that point define a common surface-to-surface tangent, 46. In this latter case, as indicated above, the roof fairing is slightly inset on its side relative to the sides of the cab roof and hence the point 44 does not as definitively define a common surface-to-surface tangent as, for example, the points 31, 34 and 40. However, for purposes of airflow, the slight inset can be ignored.

The discussion immediately above in conjunction with FIGS. 5A–5C has been provided as a definition herein for the term "continuous joint". The purpose of such a joint is to allow for the flow of air from one surface to another across the joint with little or no disruption of airflow. Therefore, it is to be understood that the joint does not have to be perfectly smooth but sufficiently smooth to present substantially no airflow disruption. As indicated above, the joints between roof 20, fairing 22 and sunvisor 24 are shown in dotted lines. The particular joints between those components that are continuous joints are indicated at J1–3J6 in FIG. 4. J1 represents one outside joint between the cab roof and roof fairing. A similar joint J2 appears on the other side of the overall assembly but is not actually shown. Joint J3 represents the outer front joint between the cab roof and roof fairing. J4 represents a front outer joint between an intermediate section of the sunvisor 24 and the cab roof. Finally, joints J5 and J6 represent outer front joints between the ends of sunvisor 24 and extensions of cab roof 20. Obviously, the overall roof assembly includes inner joints and rearward joints not illustrated in the drawings. Inasmuch as these joints do not affect the aerodynamic qualities of the overall assembly, it does not matter whether they are continuous or interrupted joints, and hence, form no part of the present invention.

Turning now to FIGS. 6–8, attention is directed to an actual working embodiment of cab roof 20. As seen in FIGS. 6 and 8, the cab roof includes a front section 32 extending forward and downward from top side 33. The cab roof also includes opposite side sections 37 which are generally vertical and which extend rearwardly from section 32. Note specifically that the front and sides of the roof depend from its top, thereby providing headroom into the roof within the interior of the cab. Extensions 39 of side sections 37 of the cab roof extend forward of front section 32. An intermediate extension or projection 41 extends out from the center of front section 32.

Referring now to FIGS. 9–11, attention is directed to an actual working embodiment of roof fairing 22. This roof fairing includes a section 43 extending from the very front end of the fairing indicated at 45 rearwardly to the top end of the fairing. Generally vertical side sections 47 are located on opposite sides of the top section.

Inasmuch as sunvisor 24 is shown in detail in FIGS. 1–4, it is not being shown separately. As illustrated in these figures, the ends of the sunvisor join the extensions 39 to establish joints J5 and J6. An intermediate, back section of the sunvisor joins the lower, forwardmost end of section 41 of roof 20 to establish joint J4. The back end of section 41 joins the forwardmost point 45 of fairing 22 to establish, in part, joint J3. The rest of the front of the roof fairing engages the top, rearward end of the front section 32 of cab roof 20 to establish the rest of J3. Finally, the lower ends of the side sections 47 of the roof fairing meet with the upper ends of the side sections 37 of the cab roof to establish joints J1 and J2.

The cab roof 20, roof fairing 22 and sunvisor 24 are integrally formed as three separate unitary members in an actual working embodiment. It is to be understood that the present invention is not limited to this. Each member could be manufactured in sections. On the other hand, the fairing and sunvisor or the cab roof and sunvisor could be integrally formed as a single unit. In addition, it is to be understood that these three components have other features which do not form part of the present invention, including, for example, suitable means for disengageably connecting them together and to the rest of truck cab 12.

We claim:

1. In a truck including a cab having a front windshield and opposite driver and passenger doors, the improvement comprising a cab roof and a separate and distinct roof fairing disengageably mounted on said cab roof so as to establish a front joint and opposite side joints between the two, said cab roof and roof fairing together presenting a combined front face which extends upward and rearward across said front joint in a substantially smooth manner along the entire length of said front joint; said cab roof and roof fairing together presenting opposite combined side faces which extend generally vertically across said side joints in a substantially smooth manner along the entire length of each side joint, and including a sunvisor disengageably connected to and in front of said cab roof at a plurality of points and located over said front windshield so as to establish an equal plurality of substantially smooth joints between the sunvisor and roof.

2. In a truck including a cab having a front windshield and opposite driver and passenger doors, the improvement comprising a cab roof, a roof fairing disengageably mounted on said cab roof so as to establish an outer front joint and opposite outer side joints between the two, and a sunvisor connected to and in front of said cab roof at a plurality of points below said roof fairing and over said front windshield so as to establish an equal plurality of outer front joints between the sunvisor and cab roof, said cab roof, roof fairing and sunvisor being configured to present a series of combined outer surfaces extending rearward starting at the forwardmost point of said sunvisor such that each of said joints defines a common surface-to-surface tangent across the joint at any point along its length.

3. In a truck including a cab having a front windshield, and opposite driver and passenger doors, the improvement comprising:
   (a) a cab roof including
      (i) a front section above the front windshield of said cab and defining an upper front edge,
      (ii) opposite side sections extending rearwardly from opposite sides of said front section above said driver and passenger doors, respectively, said side sections defining opposite upper side edges extending rearwardly from opposite sides of said front edge,
      (iii) an upwardly facing top side disposed between the upper front and side edges of said front and side sections, and
      (iv) opposite sunvisor supporting sections extending from the side sections of said cab roof on opposite sides of and in front of its front section
   (b) a roof fairing disengageably mounted to the top side of said cab roof, said fairing including
      (i) a front section defining a front edge positioned directly adjacent the upper front edge of the front section of said cab roof so as to establish a substantially smooth front outer joint between the front sections of the cab roof and fairing, and
      (ii) opposite side sections defining opposite side edges positioned directly adjacent the upper side edges of the side sections of said cab roof so as to establish opposite substantially smooth outer side joints between the side sections of said cab roof and fairing; and
   (c) a sunvisor assembly fixedly connected at opposite ends to said sunvisor supporting sections of said cab roof in a way which establishes smooth outer joint between said supporting sections and said sunvisor assembly.

4. The improvement according to claim 3 wherein said cab roof includes an intermediate sunvisor supporting section extending in the forward direction out from the front section of said cab roof and engages at opposite ends thereof adjacent segments of the front section of said roof fairing and said sunvisor assembly, respectively, in a way which establishes smooth joints therebetween.

5. The improvement according to claim 3 wherein said front sections of said cab roof and roof fairing together present a combined front face which extends upward and rearward across said front joint in a smoothly curved manner.

6. The improvement according to claim 5 wherein each of said side sections of said cab roof and roof fairing together present a combined side face which extends vertically upward smoothly across its side joint.

* * * * *

UNITED STATES PATENT AND TRADEMARK OFFICE
CERTIFICATE OF CORRECTION

PATENT NO. : 4,957,322
DATED : September 18, 1990
INVENTOR(S) : Huston Marlowe, et al.

It is certified that error appears in the above-identified patent and that said Letters Patent is hereby corrected as shown below:

Col. 1, line 56, delete "View" and insert therefor

---view---; and

Col. 3, line 49, delete "J1-3J6" and insert therefor

---J1-J6---.

Signed and Sealed this

Tenth Day of December, 1991

*Attest:*

HARRY F. MANBECK, JR.

*Attesting Officer*  *Commissioner of Patents and Trademarks*